Feb. 15, 1927.　　　　　　　　　　　　　　　　　　　　　　1,617,660
O. W. YOUNG
ANTIFRICTION BEARING
Filed Dec. 19, 1925

INVENTOR;
OTTO W. YOUNG,
BY
HIS ATTORNEY.

Patented Feb. 15, 1927.

1,617,660

UNITED STATES PATENT OFFICE.

OTTO W. YOUNG, OF CHICAGO, ILLINOIS, ASSIGNOR TO GENERAL MOTORS CORPORATION, OF DETROIT, MICHIGAN, A CORPORATION OF DELAWARE.

ANTIFRICTION BEARING.

Application filed December 19, 1925. Serial No. 76,395.

This invention relates to antifriction bearings and comprises all the features of novelty herein disclosed as embodied in a narrow roller bearing for carrying radial load.

An object of the invention is to provide an improved roller bearing in which the rollers can be retained in the outer race as a unit, the inner race being readily removable. Another object is to provide an inexpensive and compact bearing composed of few parts and one in which the effect of wear of the parts is effectively diminished.

To these ends and also to improve generally upon devices of the character indicated my invention consists in the various matters hereinafter described and claimed.

In the drawings, Figure 1 is a cross-section on the line 2—2 of Figure 2.

Figure 1:
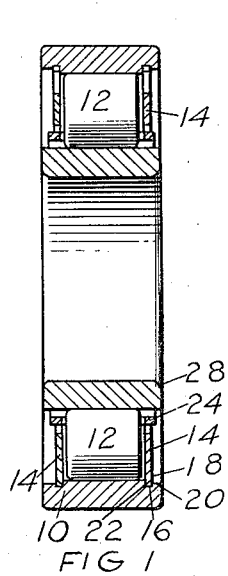
Figure 2:
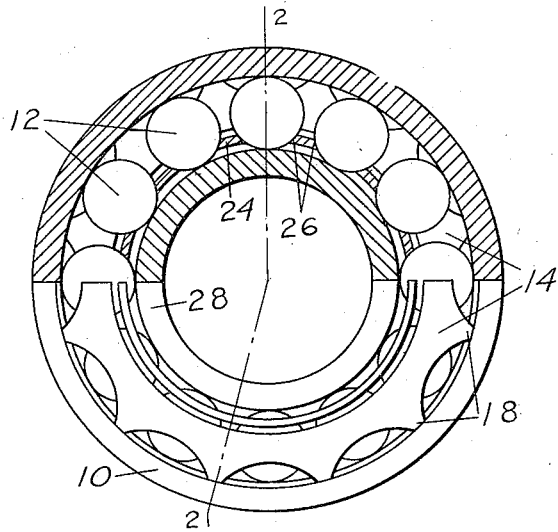
Figure 2 is a side elevation and half section.
Figure 3:
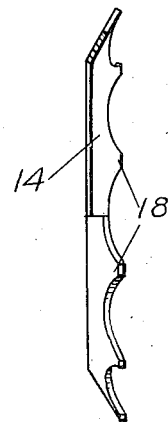
Figure 3 is a view of one of the end rings before it is attached to the race ring.

The numeral 10 indicates an outer raceway in the form of a cylindrical sleeve encircling a circular series of short cylindrical rollers 12 whose lengths are approximately equal to their diameters and the edges of the rollers being slightly chamfered to remove sharp corners and facilitate assembly. The rollers abut at their flat ends against hardened end rings 14 which are caused to interlock with grooves 16 near the ends of the outer raceway. The end rings, before being applied, are dished as shown in Figure 3 and the edges are scalloped to form a plurality of fingers 18 capable of just passing by the ledge 20 and abutting against the shoulder 22 at the inner sides of the grooves. The end rings are then pressed out flat to expand them and to cause the fingers 18 to enter the grooves and lock the rings to the race. The fingers formed by scalloping the rings enable hardened rings to be pressed from dished to flat form without cracking and the capability of expanding is increased.

In order to space the rollers and hold them in the outer raceway as a unit, in the absence of an inner raceway, a thin cylindrical band or cage 24 is provided. The band has openings for the rollers, the edges of the openings being curved as indicated at 26 to conform to the rollers. The band is of less diameter than the end rings and is smaller in diameter than the circle through the axes of the rollers so that the rollers are held against inward escape. At each end, the band extends between an end ring and a detachable inner sleeve or raceway 28 and has a small clearance with each so that it can float freely on the rollers. The openings in the band are a trifle longer than the rollers and at least as long as the distance between the end rings so that any internally induced end thrust, due to creeping of the rollers endwise, will present no thrust against the band, the thrust coming against the flattened and hardened end rings. Since the rollers travel around with respect to the end rings, any such internal thrust is distributed over the whole area of the end rings instead of coming always at the same points at the sides of the usual cage. The cage can, therefore, be made cheaply of unhardened material. Each end ring extends at right angles from its connected raceway towards the plain cylindrical raceway and extends beyond the circle through the axes of the rollers to present a large flat guiding surface to the central portions of the end faces of the rollers. The bearing as a whole is no wider than a single row ball bearing; it will carry heavy radial load and is easily assembled and inexpensive.

Figure 4:
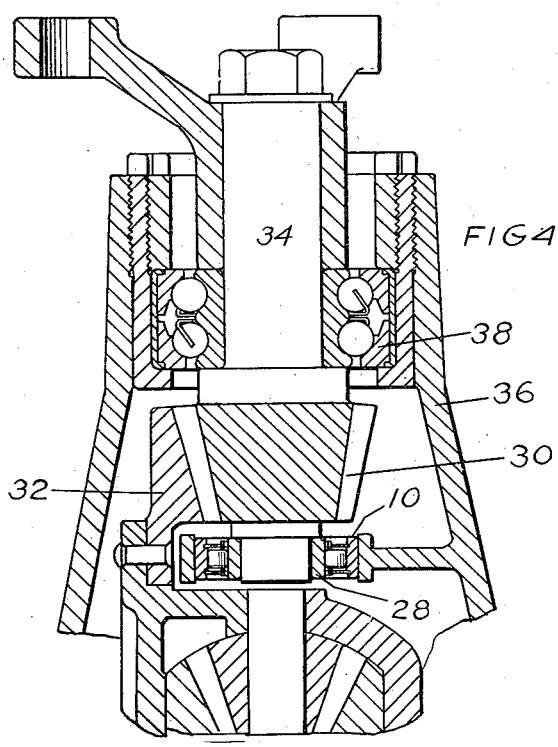
Figure 4 is a sectional view showing the bearing applied in a special mounting.

An inner plain cylindrical sleeve or raceway 28 can be slid freely in or out of the bearing and this is especially advantageous in mountings where it is desirable to have the inner sleeve secured, as with a press fit, on the end of a shaft, as indicated in Figure 4. Here a driving pinion 30 meshes with a ring gear 32 of a differential gearing and the shaft 34 to which the pinion is attached is mounted on antifriction bearings in a differential casing 36. A double row ball bearing 38 takes the end thrust of the shaft and one of the improved roller bearings is shown mounted to take radial load at the end of the shaft. With the inner race ring 28 secured on the end of the shaft, the shaft and inner race ring can be slid out leaving the rollers and outer race ring (which would not clear the ring gear 32) in place. Assembly is also facilitated.

I claim:

In a roller bearing, a circular series of short cylindrical rollers with flat end faces, an encircling sleeve forming an outer raceway for the rollers, a second sleeve forming an inner raceway for the rollers, one of said sleeves being a plain cylinder slidably removable from the rollers, hardened end rings having fingers for interlocking connection with the other sleeve between the ends of the latter, each of said end rings extending at right angles from its connected raceway towards the plain cylindrical raceway and extending beyond the circle through the axes of the rollers to present a large flat guiding surface to the central portions of the flat end faces of the rollers, and a plain cylindrical retaining band of thin sheet metal having roller holding openings smaller than the rollers, the ends of said band projecting between the end rings and the plain cylindrical raceway and having clearance with all of said last members to allow the cage to float on the rollers, and said band having a diameter to retain the rollers in assembled relation to the end rings and their connected raceway leaving the plain raceway free for relative sliding movement; substantially as described.

In testimony whereof I hereunto affix my signature.

OTTO W. YOUNG.